United States Patent
Maddali et al.

(10) Patent No.: US 7,375,499 B2
(45) Date of Patent: May 20, 2008

(54) FAULT TOLERANT SYNCHRONISATION SOURCE FOR EXCITATION CONTROL OF A THREE PHASE POWER GENERATING SYSTEM

(75) Inventors: Vijay K. Maddali, Rockford, IL (US); Michael J. Hanson, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 735 days.

(21) Appl. No.: 11/036,785

(22) Filed: Jan. 14, 2005

(65) Prior Publication Data

US 2006/0159213 A1    Jul. 20, 2006

(51) Int. Cl.
*H02P 9/10* (2006.01)

(52) U.S. Cl. .......................... 322/28; 322/586; 322/59; 322/29; 322/60; 322/63

(58) Field of Classification Search ............. 322/59.58, 322/60, 63, 28, 52, 29, 27
See application file for complete search history.

(56) References Cited

U.S. PATENT DOCUMENTS 7,242,167 B2 *   7/2007   Patterson ................. 322/59
7,304,455 B2 *  12/2007   Okahara et al. ............ 322/28

* cited by examiner

*Primary Examiner*—Darren Schuberg
*Assistant Examiner*—Iraj A Mohandesi
(74) *Attorney, Agent, or Firm*—Stephen G. Mican

(57) ABSTRACT

A fault-tolerant synchronisation source for excitation control of a three-phase generator system that combines point of regulation (POR) signals representing parameters comprising voltage and current for each phase at the POR to generate a fault-tolerant synchronisation signal.

9 Claims, 1 Drawing Sheet

FAULT TOLERANT SYNCHRONISATION SOURCE FOR EXCITATION CONTROL OF A THREE PHASE POWER GENERATING SYSTEM

FIELD OF THE INVENTION

The invention relates to three-phase generator systems, and more particularly to three-phase generator systems that have associated excitation control systems.

BACKGROUND OF THE INVENTION

The excitation voltage for a three-phase synchronous generator, such as used in an integral drive generator (IDG) for aeronautical applications, is controlled by turning on and off a solid-state switch using a Pulse Width Modulated (PWM) signal. The frequency of the PWM signal is kept low, usually about 3 times the Point Of Regulation (POR) frequency, to minimise losses in the switch. However, if the PWM frequency is not synchronised with respect to the POR frequency, significant modulation of the POR voltage occurs. One of the POR phase voltages commonly serves as a synchronisation source to prevent this occurrence. However, unbalanced load conditions, short circuit conditions, and open phase voltage sense conditions compromise this sort of synchronization source, thereby causing significant modulation of the POR voltage.

SUMMARY OF THE INVENTION

The invention overcomes the sort of conditions described above that cause the use of a POR voltage as a synchronisation source for excitation control in a three-phase generator system to fail by providing a synchronisation source that preferably uses all three phase voltages and currents. In this case, even if five out of six signals are lost, the synchronisation source continues to function.

In a preferred embodiment, the invention comprises a synchronisation source for excitation control of a three-phase generator system, comprising: a summer that adds POR signals representing parameters selected from voltage and current for two phases at a point of regulation (POR) in the generator system and subtracting POR signals representing the selected parameters for the third phase to produce a summer output signal that has a frequency corresponding to the frequency of the selected POR signals; and a zero cross detector for converting the summer output signal to a constant amplitude exciter synchronisation signal for excitation control of the three-phase generator system.

DETAILED DESCRIPTION OF THE INVENTION

Figure 1:
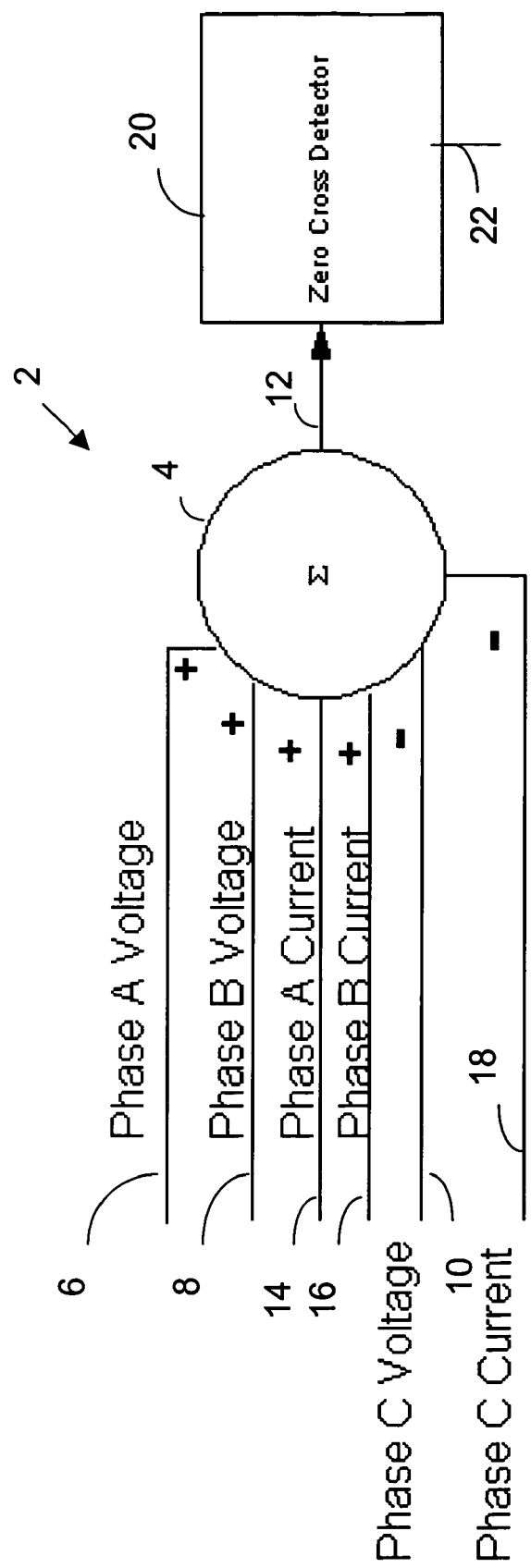
FIG. 1 shows a schematic diagram of an exciter synchronisation source according to the invention.

The invention overcomes the sort of conditions described above that cause the use of a POR voltage as a synchronisation source to fail by providing a synchronisation source that uses six measured signals representing two different parameters of the POR, the POR voltages and currents for all three phases. Even if five out of six signals are lost, the synchronisation source continues to function.

FIG. 1 shows a schematic diagram of an exciter synchronisation source 2 according to the invention. An exciter system for a three-phase generator, such as an aeronautical IDG (not shown), has a desired POR at which two different parameters for the POR, voltages and currents for each phase, conveniently represented as phases "A", "B" and "C", are measured with appropriate voltage and current sensors (not shown). A summer 4 adds POR signals representing a first parameter of phases A and B, the voltages of phases A and B on lines 6 and 8, respectively, and subtracts a signal representing the first parameter of phase C, the voltage of phase C on line 10. The basic principle of the invention is that subtracting one of the three phase voltage signals from the sum of the other two results in a summer output signal on an output line 12 of the summer 4 with a waveform that still has the same frequency as each of the voltage signals for the three phases. Loss of any two out of three signals still results in a signal that has same frequency as the incoming signals.

Similarly, the summer 4 adds signals representing a second parameter of the phases A and B, the currents of phases A and B on lines 14 and 16, respectively, and subtracts a signal representing the second parameter of phase C, the current of phase C on line 18. Again, subtracting one of the three phase current signals from the sum of the other two results in a waveform on an output line 12 of the summer 4 that still has the same frequency as that of the current signals for the three phases. Having the combination of six input signals to the summer 4 on lines 6, 8, 10, representing voltages, and on lines 14, 16 and 18, representing current, provides a fault-tolerant synchronisation source that can lose five of the six input signals and still provide a signal with an accurate synchronisation frequency on the summer output line 12. A zero crossing detector 20 conveniently transforms the summer output signal to a constant amplitude synchronisation signal on line 22 that may be used to regulate the exciter system in a conventional manner.

Although it is most desirable to have input signals for both voltages and currents for each phase above for maximum fault tolerance, it shall be appreciated by those skilled in the art that voltage or current signals alone can be used, in which case the synchronisation source 2 can still provide an accurate synchronisation signal with the loss of two out of three signals, as described above.

Described above is a fault-tolerant synchronisation source for excitation control of a three-phase generator system that combines POR signals representing parameters comprising voltage and current for each phase at the POR to generate a fault-tolerant exciter control synchronisation signal. It should be understood that this embodiment is only an illustrative implementation of the invention, that the various parts and arrangement thereof may be changed or substituted, and that the invention is only limited by the scope of the attached claims.

What is claimed is:

1. A synchronisation source for excitation control of a three-phase generator system, comprising:
a summer that adds POR signals representing parameters selected from voltage and current for two phases at a point of regulation (POR) in the generator system and subtracting POR signals representing the selected parameters for the third phase to produce a summer output signal that has a frequency corresponding to the frequency of the selected POR signals; and a zero cross detector for converting the summer output signal to a constant amplitude exciter control synchronisation signal for excitation control of the three-phase generator system.

2. The synchronisation source of claim 1, wherein the summer has inputs for POR signals that represent both voltage and current for each phase at the POR.

3. The synchronisation source of claim 1, wherein the summer has inputs for POR signals that represent voltage for each phase at the POR alone.

4. The synchronisation source of claim 1, wherein the summer has inputs for POR signals that represent current for each phase at the POR alone.

5. A synchronisation source for excitation control of a three-phase generator system, comprising:

a summer that adds POR signals representing voltage for two phases at a point of regulation (POR) in the generator system and subtracts a POR signal representing voltage for the third phase to produce a summer output signal that has a frequency corresponding to the frequency of the selected POR signals; and a zero cross detector for converting the summer output signal to a constant amplitude exciter control synchronisation signal for excitation control of the three-phase generator system.

6. The synchronisation source of claim 5, wherein the summer additionally adds POR signals representing current for two phases at a point of regulation (POR) in the generator system and subtracts a POR signal representing current for the third phase to produce the summer output signal.

7. A synchronisation source for excitation control of a three-phase generator system, comprising:

a summer that adds POR signals representing current for two phases at a point of regulation (POR) in the generator system and subtracting a POR signal representing the current for the third phase to produce a summer output signal that has a frequency corresponding to the frequency of the selected POR signals; and a zero cross detector for converting the summer output signal to a constant amplitude exciter control synchronisation signal for excitation control of the three-phase generator system.

8. The synchronisation source of claim 5, wherein the summer additionally adds POR signals representing voltage for two phases at a point of regulation (POR) in the generator system and subtracts a POR signal representing current for the third phase to produce the summer output signal.

9. A synchronisation source for excitation control of a three-phase generator system, comprising:

a summer that adds POR signals representing voltage and current for two phases at a point of regulation (POR) in the generator system and subtracting POR signals representing voltage and current for the third phase to produce a summer output signal that has a frequency corresponding to the frequency of the selected POR signals; and a zero cross detector for converting the summer output signal to a constant amplitude exciter control synchronisation signal for excitation control of the three-phase generator system.

* * * * *